Patented Aug. 19, 1941

2,253,285

UNITED STATES PATENT OFFICE 2,253,285

CRACKING OIL BY LEACHED ZEOLITES

Gerald C. Connolly, Baton Rouge, La., assignor to Standard Oil Development Company, a corporation of Delaware No Drawing. Application March 29, 1938, Serial No. 198,689

3 Claims. (Cl. 196—52)

This invention relates to absorptive catalysts adapted for the treatment of hydrocarbons and particularly for the catalytic cracking of hydrocarbons. It more particularly pertains to adsorptive catalysts which will have a high catalytic activity combined with good regenerative properties.

While the catalysts so produced in the broader phases of the invention will have a more general application, such as in other types of hydrocarbon reactions including purifying and refining, it has been found to be particularly suitable for catalytic cracking.

It has previously been known that hydrocarbon oil cracked in the presence of certain solid adsorbent contact materials such as naturally active or activated clays results in the formation of high yields of motor fuel having high antiknock properties.

During the cracking operation the contact mass becomes fouled more or less rapidly with carbonaceous deposits requiring periodic discontinuance of the cracking treatment to remove such deposits. This removal is usually accomplished by passing an oxidizing gas through the mass and burning off the carbon. Such treatment results in the evolution of large amounts of heat.

One objection to the use of adsorptive clays for catalytic cracking is that when exposed to high temperatures in excess of 1000° F. for example, such materials rapidly lose their catalytic activity. In view of this it is necessary to provide means for rapidly removing heat liberated during regeneration to avoid permanent impairment of the efficiency of the catalyst. One method of controlling regenerating temperature is to dilute the oxidizing gas with an inert gas to reduce the reaction rate and increase the capacity of the gases to remove heat of reaction. This necessarily slows down the regeneration and increases the length of time the catalyst and reaction chamber is out of operation this requiring more reaction chambers to produce a given yield of gasoline.

It is generally known that the activity of adsorptive materials as catalysts is due not only to the chemical composition but also, in a large measure to a capillary physical structure permitting the mass to adsorb large volumes of reactant gases. The adsorptive or capillary properties of such materials is attributed to be due to the presence of an infinite number of ultra microscopic pores presenting a large internal surface on which the reaction is brought about.

It will thus be apparent that the size and number of pores formed has an important influence on the catalytic efficiency of such materials.

It is an object of the present invention to provide an improved adsorptive cracking catalyst having a higher efficiency and which will maintain its efficiency over extended periods despite frequent regenerations by oxidation.

A further object of the invention is to provide a method of producing adsorptive catalysts having high catalytic activity and good regenerative properties.

Other more specific objects and advantages of my invention will be apparent from the more detailed description hereinafter.

Having outlined the general nature and objects, the invention will be better understood from the more detailed description of the preferred embodiment, it being understood that the invention is not limited to all of the specific details given but cover such other variations and modifications as come within the scope of the appended claims.

In accordance with the present invention, zeolites or base exchange compounds in which the non-exchangeable nucleus consists principally of the hydrated oxides of silica and alumina is employed as starting material in the preparation of the catalyst.

These compounds are characterized by the fact that they contain a basic component capable of being replaced by other basic components. For example, one common zeolite is hydrated sodium aluminum silicate. This product may be expressed by the formula $$(Na_2O)_x.(Al_2O_3y.SiO_{2z})(H_2O)_n$$

in which the $Na_2O$ forms the exchangeable base, the $Al_2O_3$ the non-exchangeable base and the $SiO_2$ the acid nucleus. This $(Al_2O_3.SiO_2)$ is here referred to as the non-exchangeable nucleus. This product is employed extensively as a water softening agent. When contacted with water containing salts of calcium, for example, the $Na_2O$ component is replaced by $CaO$ forming hydrated calcium aluminum silicate $CaO_x.(Al_2O_3y.SiO_{2z})(H_2O)_n$. This product can be again converted back to a sodium aluminum silicate by treating with a solution containing a relatively high concentration of sodium ions such as a solution of common salt.

Base exchange compounds are well known articles of commerce and while there are natural occurring zeolite clay deposits the greater portion of the products are produced synthetically, such as for example, by reacting sodium silicate with sodium aluminate, or by reacting sodium silicate and aluminum sulphate. These reactants when properly combined form a gel characterized by a highly porous structure having ultra-microscopic pores. These products may be purchased under a number of different trade names such as "Doucil," Permutit, etc. "Doucil" for example, is a hydrated sodium aluminum silicate the typical analysis of which when calculated on a dry basis is: $Na_2O$ 12.44%, $Al_2O_3$ 20.97% and $SiO_2$ 66.59%. As marketed, the product contains about 50% water.

For purposes of the present invention artificial zeolites are much to be preferred over natural zeolites.

In accordance with the present invention the artificial zeolite is first treated with an acid to completely neutralize the base exchange component. The product is then washed with water until completely free of acid ions. The product is afterwards dried at low temperature such as below 212° F. for several hours and then slowly heated to a temperature of 800° F. or 1000° F. The product is maintained at such temperature for a period of from three or four hours.

The concentration of the acid, temperature and duration of the washing treatment and other conditions are properly controlled to produce a product having an apparent density of from about 0.4 to 0.8. The apparent density can be decreased for example, by increasing the acid concentration, the temperature of the water wash or the length of washing treatment.

It is important to continue the acid treatment until the base exchange component is completely removed. The presence of such base exchange components such as, for example, alkali or alkali earth metal oxides causes the product to lose its desirable porous structure when exposed to repeated regeneration due, presumably, to the low fusion temperature of such materials.

The term apparent density as here employed means the weight of one cubic centimeter of 8–14 mesh granules or in other words granules which will pass through an 8 mesh U. S. Standard sieve series screen, but will remain on a 14 mesh screen. Apparent density measurements have been found to be an indirect but nevertheless definite indication of pore size. It has been found that a product having pore sizes corresponding to apparent densities measurements within the above mentioned units are peculiarly suited for catalytic cracking.

The acid treatment of the zeolite not only removes the base exchange component but in most cases it also results in reducing the aluminum oxide content. The relative ratios of silica and alumina present in the final product may, however, be controlled as desired by any one or more of the following methods:

First, the relative amounts of silica and alumina present in the zeolite prior to the acid treatment may be varied as desired by changing the proportions of sodium silicate and sodium aluminate employed in its manufacture. In this way the original zeolite may have sufficient excess alumina prior to acid treatment to compensate for loss of alumina during such treatment. Second, the washed zeolite after the acid treatment may be impregnated with a decomposable salt of aluminum, such as aluminum nitrate and the salt thereafter decomposed leaving $Al_2O_3$ distributed uniformly throughout the mass. Third, the acid treated zeolite may be homogenized such as in a ball mill or equivalent, with alumina either in the form of a gel, hydrogel, activated alumina, bauxite, etc. It is preferred in this case to employ alumina having a capillary structure as distinguished from a solid structure such as ignited alumina. The relative proportions of silica and alumina may vary over an extended range. For example, the molar ratios of silica to alumina may be between about 5 to 1 to 20 to 1. It is preferred, however, to employ a ratio of between 10 to 1 and 15 to 1 and preferably about 12 to 1.

Another method for removal of the $Na_2O$ group and retaining practically all the $SiO_2$ and $Al_2O_3$, is to leach with a mixed solution of $NH_4OH$ and $HCl$ containing a slight excess of $HCl$, or the leaching may be done with a $NH_4Cl$ solution if desired.

The following examples will serve to illustrate the invention, it being understood that the values given are illustrative rather than limitive.

Example 1

1000 grams of a sodium aluminum silicate (containing about 50% water synthetically produced, and marked under the trade name of "Doucil," having a typical analysis as above described) was placed in a suitable receptacle into which 490 cc. of concentrated hydrochloric acid and 750 cc. of water was introduced. The mixture was brought to about 200° F. and allowed to stand over night with occasional stirring. The free liquor was then decanted and washed with water at a temperature of about 70° F. until no more than a trace of chlorine ions was shown to be present when tested with silver nitrate. All of the sodium oxide was extracted and some of the $Al_2O_3$. The mol ratio of silica to alumina was about 12.8 to 1.

This product was then admixed with 20% activated clay of the type known as "Superfiltrol" and 2% graphite and molded into pills. The resulting product had an apparent density of .8 when heated to 1000° F. for a four hour period.

To test the activity of such catalyst East Texas gas oil of 33.8 A. P. I. gravity preheated to 850° F. was passed in vapor form over the catalyst at a rate of .6 volume of liquid feed per volume of catalyst per hour over two hour cracking periods. This treatment resulted in conversion of about 44.0% liquid distillate boiling below 400° F.

Example 2

A catalyst was produced in accordance with Example 1 except that conditions were controlled to produce a product having a molar ratio of silica to alumina of about 20 to 1 and an apparent density of about .46. The product was pilled without addition of other constituents. This catalyst when tested under the same conditions outlined in Example 1 resulted in conversions of 37.5% liquid distillate product of 400 end point.

Example 3

A product was prepared as in Example 2 except that the treating conditions were controlled in such manner that the molar ratio of silica to alumina was about 14 to 1 and the apparent density of the resulting product was .61. This product when employed as a cracking catalyst under the same conditions outlined in Example 1 resulted in yields of 39.0% liquid distillate at 400° F. end point.

Example 4

A powdered product produced according to Example 2 was impregnated with aluminum nitrate solution. The impregnated product was then heated to convert the nitrate into oxide. About 2½% of alumina was added to the product of Example 2 in this manner so that the final product had a molar ratio of 14.2 to 1 and an apparent density of .58.

This product after being compressed into pills when tested under conditions specified in Example 1 resulted in a conversion of 37.0% liquid distillate of 400° F end point.

A powdered catalyst prepared according to Example 2 was homogenized in a ball mill with dry alumina gel in such proportions as to produce a product having a mol ratio of 10 to 1 and an apparent density of .49. This product when tested under conditions specified in Example 1 resulted in a conversion of 39.0% liquid distillate of 400° F. end point.

While the product comprising one phase of the invention has been described as consisting of an acid treated zeolite in which the non-exchangeable nucleus consists of alumina as the non-exchangeable basis component and silica as the acidic oxide component, it will be understood that other minor constituents such as promoters, diluents, activators as stabilizers may also be incorporated by methods well known in the art. For example, other acidic oxides such as molybdenum oxide, tungsten oxide, titanium oxide, boron oxide, chromic oxide, etc. may be substituted in whole or in part for silica as the acidic component of the non-exchangeable nucleus by employing corresponding salts of said acidic oxides in lieu of or in addition to the sodium silicate in the preparation of the zeolite. Likewise other amphoteric oxides such as the oxides of tin, zinc, boron, etc. may be substituted in whole or in part for the alumina by employing the corresponding metallate in lieu of or in addition to sodium aluminate.

Other methods of incorporating additional constituents will be readily obvious to those skilled in the art.

While the invention has been described as a catalyst specifically for the cracking of hydrocarbon oils, it is understood that in its broader phases it may have a more general application in the treatment of hydrocarbons such as for purifying and refining of oils and polymerization, hydrogenation or dehydrogenation of hydrocarbons.

Having described the preferred embodiment and given specific examples thereof, it will be understood that it embraces such other modifications and variations as come within the spirit and scope of the accompanying claims.

I claim:

1. A method of cracking hydrocarbon oil which comprises passing the oil while at cracking temperature in contact with an adsorptive catalytic mass consisting principally of silica and alumina formed by acid treating a zeolite compound containing an exchangeable base in an amount suitable for use as a water softening agent, continuing said acid treatment until said base exchange component is completely removed and the resulting product has an apparent density between 0.4 and 0.8, and maintaining said oil in contact with said catalyst for a period sufficient to obtain the desired cracking thereof.

2. A method of cracking hydrocarbon oil which comprises passing said oil while at cracking temperature in contact with an adsorptive catalytic mass consisting principally of silica and alumina formed by acid treating a zeolite compound containing an exchangeable base in an amount suitable for use as a water softening agent, continuing said treatment until the resulting product is substantially free of said base exchange component and has an apparent density between 0.4 and 0.8, the resulting product having a molar ratio of silica to alumina between the limits of 5 to 1 to 20 to 1, and maintaining said oil in contact with said catalyst until the desired cracking is obtained.

3. A method of cracking hydrocarbon oil which comprises passing the oil to be cracked while at cracking temperature in contact with a synthetic gel consisting principally of silica and alumina formed by acid treating a zeolite gel containing a base exchange component in an amount suitable for use as a water softening agent, continuing the acid treatment until said exchangeable basic component is substantially removed therefrom, regulating the amount of silica and alumina so that the molar ratio thereof is between 10 and 15 to 1, and maintaining said oil in contact with the catalyst for a period sufficient to obtain the desired cracking.

GERALD C. CONNOLLY.

CERTIFICATE OF CORRECTION.

Patent No. 2,253,285. August 19, 1941.

GERALD C. CONNOLLY.

It is hereby certified that error appears in the above numbered patent requiring correction as follows: In the grant, line 6, title of invention, for the word "ZEROLITES" read --ZEOLITE--; and in the heading to the printed specification, line 2, for "ZEOLITES" read --ZEOLITE--; and that the said Letters Patent should be read with this correction therein that the same may conform to the record of the case in the Patent Office.

Signed and sealed this 7th day of October, A. D. 1941.

(Seal)

Henry Van Arsdale,
Acting Commissioner of Patents.